(12) United States Patent
Saeki et al.

(10) Patent No.: US 7,827,113 B2
(45) Date of Patent: Nov. 2, 2010

(54) METHOD AND SYSTEM FOR PROVIDING A CONTENT SUBSCRIPTION SERVICE

(75) Inventors: Keiko Saeki, Tokyo (JP); Motomasa Futagami, San Jose, CA (US); Yoji Kawamoto, Tokyo (JP); Motohiko Nagano, Tokyo (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1099 days.

(21) Appl. No.: 11/095,051

(22) Filed: Mar. 30, 2005

(65) Prior Publication Data

US 2006/0230458 A1  Oct. 12, 2006

(51) Int. Cl.
*G06F 21/00* (2006.01)
*H04K 1/00* (2006.01)
*H04L 9/00* (2006.01)

(52) U.S. Cl. .................................. 705/59; 705/52
(58) Field of Classification Search ............... 705/50–59
See application file for complete search history.

(56) References Cited

U.S. PATENT DOCUMENTS

| | | | |
|---|---|---|---|
| 2002/0052933 A1* | 5/2002 | Leonhard et al. | 709/219 |
| 2002/0114466 A1* | 8/2002 | Tanaka et al. | 380/232 |
| 2003/0004888 A1* | 1/2003 | Kambayashi et al. | 705/59 |
| 2003/0028488 A1 | 2/2003 | Mohammed et al. | |
| 2003/0220883 A1 | 11/2003 | Block et al. | |
| 2003/0233561 A1 | 12/2003 | Ganesan et al. | |
| 2004/0039911 A1* | 2/2004 | Oka et al. | 713/175 |
| 2004/0054930 A1 | 3/2004 | Walker et al. | |
| 2004/0098348 A1* | 5/2004 | Kawasaki et al. | 705/59 |
| 2004/0098492 A1 | 5/2004 | Atkinson et al. | |
| 2004/0143760 A1 | 7/2004 | Alkove et al. | |
| 2004/0186853 A1 | 9/2004 | Yamamoto et al. | |
| 2005/0021635 A1 | 1/2005 | Graham et al. | |
| 2005/0060701 A1* | 3/2005 | Murase | 717/178 |
| 2005/0216413 A1* | 9/2005 | Murakami et al. | 705/51 |
| 2007/0168294 A1* | 7/2007 | Tsurukawa | 705/59 |

* cited by examiner

OTHER PUBLICATIONS

PCT International Search Report and Written Opinion of the International Searching Authority, PCT?US 06/28853, mail date Aug. 22, 2007, pp. 1-11.

*Primary Examiner*—Andrew J. Fischer
*Assistant Examiner*—C. Aaron McIntyre
(74) *Attorney, Agent, or Firm*—Fitch, Even, Tabin & Flannery

(57) ABSTRACT

Methods and systems of distributing digital content governed by a digital license are provided. In one aspect, the license has identification data for licensed content and is transmitted to a client device. A first item of content is transmitted to the client after receipt by the client of the license. The first item of content has first content identification data, and at least a portion of the first item of content is in encrypted form. A second item of content is transmitted to the client after receipt by the client of the license. The second item of content has second content identification data that is different from the first content identification data. At least a portion of the second item of content is in encrypted form. The encrypted portion of the first item of content is decrypted if the first content identification data corresponds to the identification data for licensed content. Similarly, the encrypted portion of the second item of content is decrypted if the second content identification data corresponds to the identification data for licensed content. The identification data for licensed content remains unchanged after the license is transmitted to the client.

27 Claims, 8 Drawing Sheets

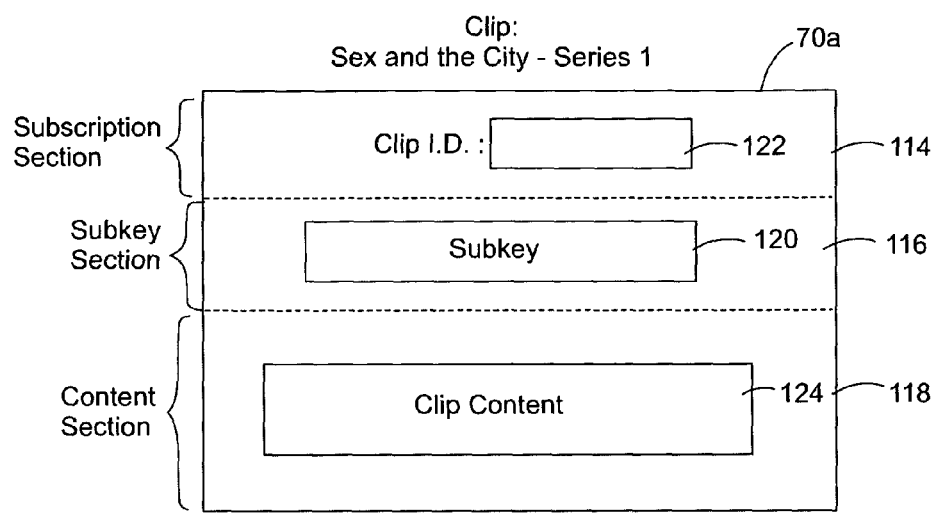
FIG. 6
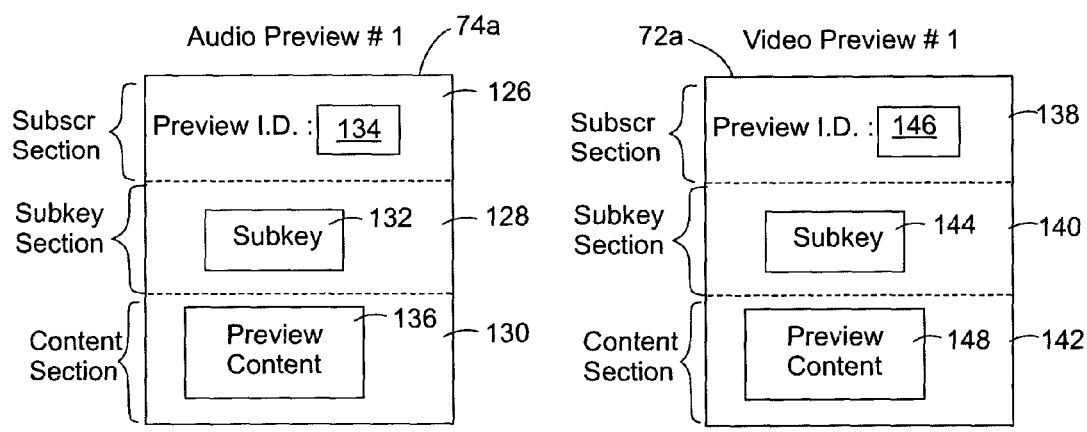
FIG. 7
FIG. 8

| CONTENT ITEM | I.D. Field Value |
|---|---|
| "Sex and the City - Series 1" | 1 |
| "Sex and the City - Series 2" | 2 |
| "Sex and the City - Series 3" | 3 |
| "Sex and the City - Series 4" | 4 |
| "Sex and the City - Series 5" | 5 |
| "Clip: Sex and the City - Series 1" | 1 |
| ⋮ | ⋮ |
| "Clip: Sex and the City - Series 5" | 5 |
| "Video Preview #1" | 2 |
| ⋮ | ⋮ |
| "Video Preview #10" | 2 |
| "Audio Preview #1" | 1 |
| ⋮ | ⋮ |
| "Audio Preview #10" | 1 |

FIG. 9

METHOD AND SYSTEM FOR PROVIDING A CONTENT SUBSCRIPTION SERVICE

FIELD OF INVENTION

The present invention relates to the field of content delivery. More particularly, the present invention relates to the field of distributing digital content that is governed by digital licenses.

BACKGROUND

Providers of digital video content, audio content or other types of content often are reluctant to deliver this content over the Internet without effective content protection. While the technology exists for content providers to provide content over the Internet, digital content by its very nature is easy to duplicate either with or without the owner's authorization. The Internet allows the delivery of the content from the owner, but that same technology also permits widespread distribution of unauthorized, duplicated content.

Digital Rights Management (DRM) is a digital content protection model that has grown in use in recent years as a means for protecting file distribution. DRM usually encompasses a complex set of technologies and business models to protect digital media or other data and to provide revenue to content owners.

Many known DRM systems use a storage device, such as a hard disk drive component of a computer, that contains a collection of unencrypted content (or other data) provided by content owners. The content in the storage device resides within a trusted area behind a firewall. Within the trusted area, the content residing on the storage device can be encrypted. A content server receives encrypted content from the storage device and packages the encrypted content for distribution. A license server holds a description of rights and usage rules associated with the encrypted content, as well as associated encryption keys. (The content server and license server are sometimes part of a content provider system that is owned or controlled by a content provider (such as a studio) or by a service provider.) A playback device or client receives the encrypted content from the content server for display and receives a license specifying access rights from the license server.

Some DRM processes consist of requesting an item of content, encrypting the item with a content key, storing the content key in a content digital license, distributing the encrypted content to a playback device, delivering a digital license file that includes the content key to the playback device, and decrypting the content file and playing it under the usage rules specified in the digital license.

However, as more and more content is delivered to end-users, such known DRM schemes can place a burden on the servers of the content or service providers. For each request for a particular item of content by each user, the servers are required to create a "package," including the generation of decryption keys, the generation of a content license, and the encryption of the content itself.

For distributions that involve a subscription model of business, more and more burdens can be placed on content provider servers using known DRM schemes wherein each item of content is "packaged" for the subscriber. If the user pays for one license in advance for a subscription of content, scenarios may develop whereby the content that is accessible to the user builds up over time and may exceed that which was paid for.

Thus an improved method and system of protection mechanisms are desirable to accomplish delivery of protected data or media.

SUMMARY OF THE ILLUSTRATED EMBODIMENTS

Methods and systems of distributing digital content governed by a digital license are disclosed. According to some embodiments of the invention, the issuance of licenses and content to users is facilitated so that one license can govern usage rights to a plurality of items of content that are received by a client device after the license has been received. Moreover, the licenses have data located in licensed content identification fields that remain unchanged after the license has been received by the user. Thus embodiments of the invention can be used as part of a subscription business model whereby one license is issued to a client, and thereafter a plurality of items of content can be transmitted to and used by the client under the control of this one license.

In one aspect, a license having identification data for licensed content is transmitted to the client. A first item of content is transmitted to the client after receipt by the client of the license. The first item of content has first content identification data, and at least a portion of the first item of content is in encrypted form. Similarly, a second item of content is transmitted to the client after receipt by the client of the license. The second item of content has second content identification data that is different from the first content identification data. At least a portion of the second item of content is in encrypted form.

The first item of content is decrypted if the first content identification data corresponds to the identification data for licensed content. Similarly, the second item of content is decrypted if the second content identification data corresponds to the identification data for licensed content. The identification data for licensed content remains unchanged after the license is transmitted to the client.

In another aspect, the first and second items of content are transmitted to the client at different points in time, wherein the points in time are spaced apart from each other by a time interval of at least about one day.

In another aspect, the license has a first subkey, the first item of content has a second subkey, and the second item of content has a third subkey. A first decryption key is generated using the first and second subkeys, and a second decryption key is generated using the first and third subkeys. The first item of content is decrypted using the first decryption key, and the second item is decrypted using the second decryption key.

In another embodiment, a license having identification data for licensed content and having play count data is transmitted to a client. A first item of content is transmitted to the client after receipt by the client of the license. At least a portion of the first item of content is in encrypted form. The first item of content has first content identification data and is comprised of N discretely-usable items of subcontent, where N is an integer greater than 2. At least a portion of P of the N discretely-usable items of subcontent are decrypted if the first content identification data corresponds to the identification data for licensed content, where P is an integer less than N, and where P corresponds to the play count data. The identification data for licensed content and the play count data remain unchanged after the license is transmitted to the client. In other embodiments, the N discretely-usable items of subcontent can be comprised of N television shows or can be comprised of N musical works.

In yet another embodiment, a data structure for being transmitted to a client and for licensing a first plurality of items of content for use by the client is provided. Each of the first plurality of items of content has a first content identification field. The data structure comprises a first license identification field for specifying the identity of each of the first plurality of items of content and for holding a first set of identification data corresponding to the identity each of the first plurality of items of content. The first license identification field and the plurality of first content identification fields are adapted to allow the client to use the first plurality of items of content when the client receives the first plurality of items of content after a point in time that the data structure is transmitted to the client. The first set of identification data is adapted to remain unchanged after the data structure is transmitted to the client.

There are additional aspects to the present inventions. It should therefore be understood that the preceding is merely a brief summary of some embodiments and aspects of the present inventions. Additional embodiments and aspects are referenced below. It should further be understood that numerous changes to the disclosed embodiments can be made without departing from the spirit or scope of the inventions. The preceding summary therefore is not meant to limit the scope of the inventions. Rather, the scope of the inventions is to be determined by appended claims and their equivalents.

BRIEF DESCRIPTION OF THE DRAWINGS

These and/or other aspects and advantages of the present invention will become apparent and more readily appreciated from the following description of the preferred embodiments, taken in conjunction with the accompanying drawings of which:

FIG. 6 is a simplified diagram of another item of digital content according to some embodiments of the invention;

FIG. 7 is a simplified diagram of another item of digital content according to some embodiments of the invention;

FIG. 8 is a simplified diagram of another item of digital content according to some embodiments of the invention;

FIG. 9 is a chart showing the assignment of identification field values according to one embodiment of the invention.

DETAILED DESCRIPTION

Figure 1:
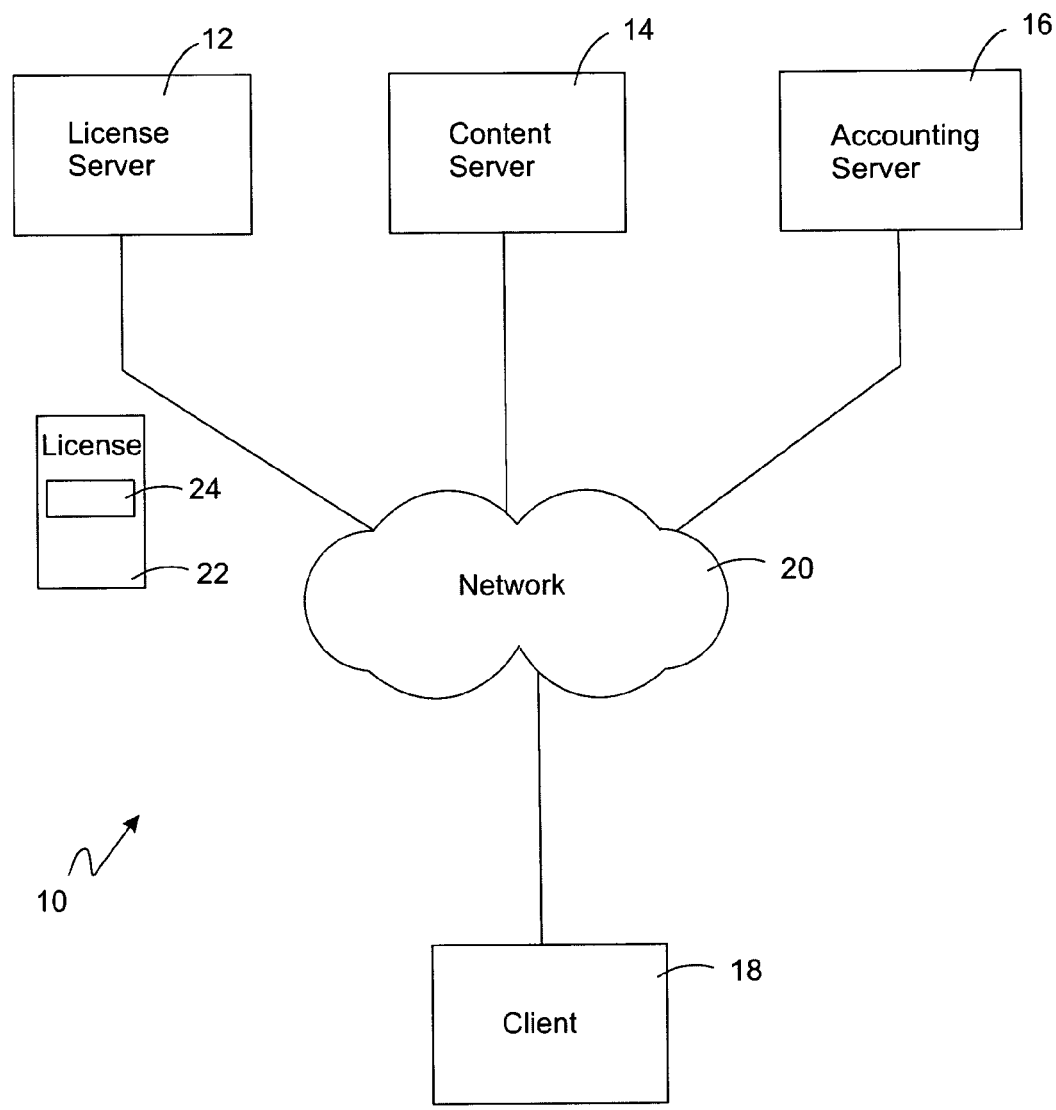
FIG. 1 is a simplified block diagram of a content providing system according to some embodiments for use in distributing content.

Reference will now be made in detail to embodiments of the present invention, examples of which are illustrated in the accompanying drawings, wherein like reference numerals refer to like elements throughout. It is understood that other embodiments may be used, and structural and operational changes may be made without departing from the scope of the present invention.

Referring to FIG. 1, there is shown an exemplary configuration of a content providing system 10 to which the present invention is applied. The content providing system 10 handles protected content which can include video data, audio data, image data, text data, etc. A license server 12, a content server 14, and an accounting server 16 are each connected to a client 18 and to each other via a network 20 which is the Internet for example. In this example, only one client 18 is shown, but those skilled in the art will appreciate that any number of clients may be connected to the network 20.

The content server 14 provides content to the client 18. The license server 12 grants a license 22 having a subscription section 24 necessary for the use by the client 18 of the content. The accounting server 16 is used to bill the client 18 when it is granted the license 22. While the illustrated embodiment shows three servers in communication with the client 18, it will be understood that all of these server functions could be included in a fewer or greater number of servers than the three which are shown here.

Figure 2:
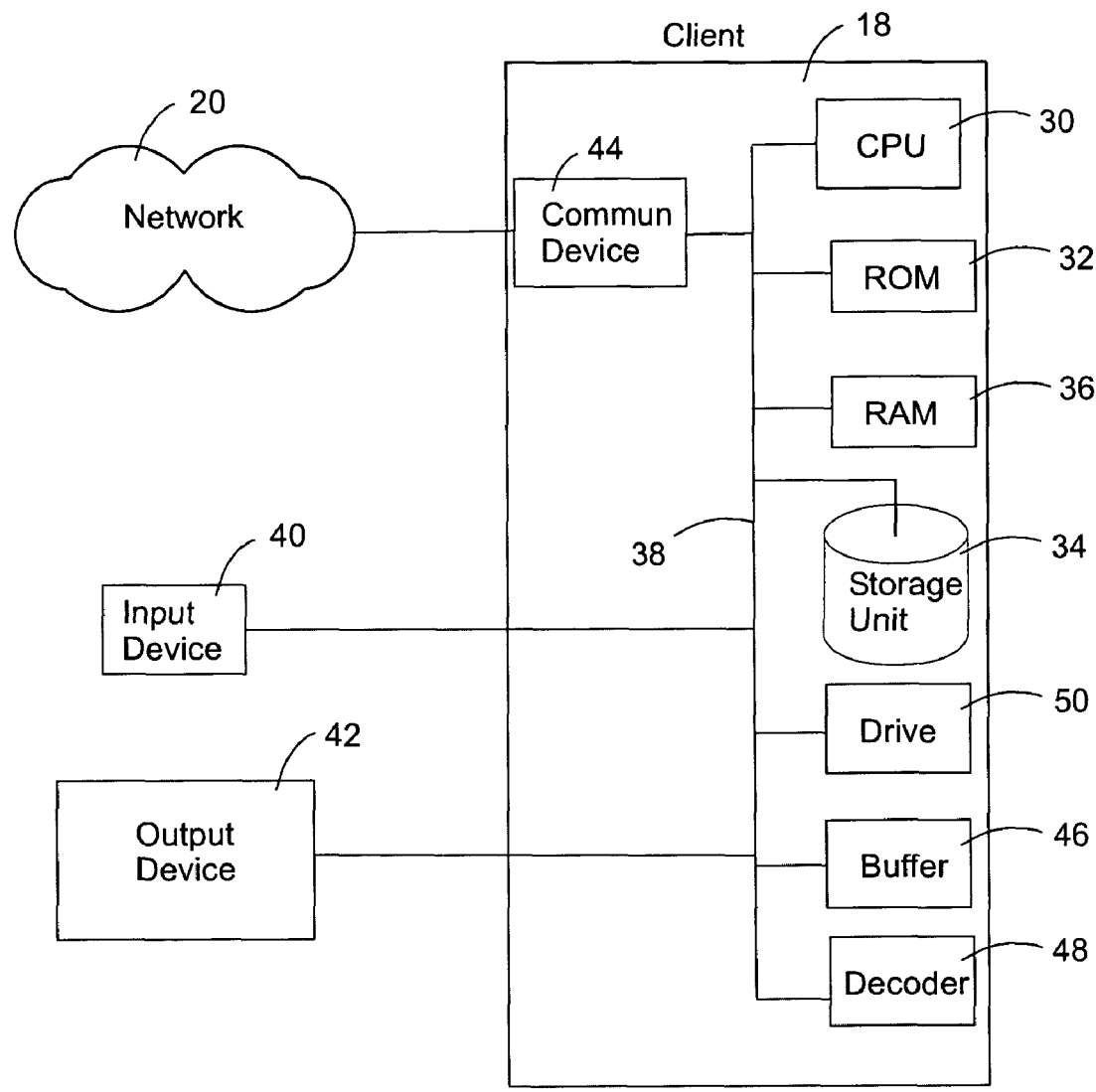
FIG. 2 is a simplified block diagram of a hardware environment for a client device according to one embodiment of the invention.

FIG. 2 illustrates an exemplary configuration of the client 18. Referring to FIG. 2, a central processing unit (CPU) 30 executes a variety of processing operations as directed by programs stored in a read only memory (ROM) 32 or loaded from a storage unit 34 into a random access memory (RAM) 36. The RAM 36 also stores data and so on necessary for the CPU 30 to execute a variety of processing operations as required.

The CPU 30, the ROM 32, and the RAM 36 are interconnected via a bus 38. The bus 38 further connects an input device 40 composed of a keyboard and a mouse for example, an output device 42 composed of a display unit based on CRT or LCD and a speaker for example, the storage unit 34 based on a hard disk drive for example, and a communication device 44 based on a modem, network interface card (NIC) or other terminal adaptor for example.

The ROM 32, RAM 36 and/or the storage unit 34 stores operating software used to enable operation of the client 18. A buffer 46 receives and buffers sequential portions of streaming encrypted content from the content server 14 (FIG. 1) via the network 20 while using an associated decryption key (not shown) needed to decrypt the encrypted content. The encrypted content and the associated decryption key are sent to a decoder 48. The decoder 48 decrypts and decodes the content using the decryption key associated with the content.

The communication device 44 executes communication processing via the network 20, sends data supplied from the CPU 30, and outputs data received from the network 20 to the CPU 30, the RAM 36, and the storage unit 34. The storage unit 34 transfers information with the CPU 30 to store and delete information. The communication device also communicates analog signals or digital signals with other clients.

The bus 38 is also connected with a drive 50 as required on which a magnetic disk, an optical disk, a magneto-optical disk, or a semiconductor memory for example is loaded for computer programs or other data read from any of these recording media being installed into the storage unit 34.

Although not shown, the content server 14, the license server 12, and the accounting server 16 (FIG. 1) are also each configured as a computer which has basically the same configuration as that of the client 18 shown in FIG. 2. While FIG. 2 shows one configuration of the client 18, alternative embodiments include a set top box, a personal computer, a portable playback device, or any other type of a computer device.

In the content providing system 10, the license and content servers 12, 14 send the license 22 and the content to the client 18. (FIG. 1) The license 22 is required to enable the client 18 to use (i.e., render, reproduce, copy, execute, etc.) the protected content which typically is in encrypted form.

Each item of content is configured and encrypted by a service provider organization using one or more encryption keys. The client 18 decrypts and reproduces the received item of content on the basis of the license information and the content. In some embodiments, the license information includes usage rights, such as for example, the expiration date beyond which the item of content may not be used, the number of times that the content may be used, the number of times that the content can be copied to a recording medium such as a CD for example, and the number of times that the content may be checked out to a portable device.

Figure 3:
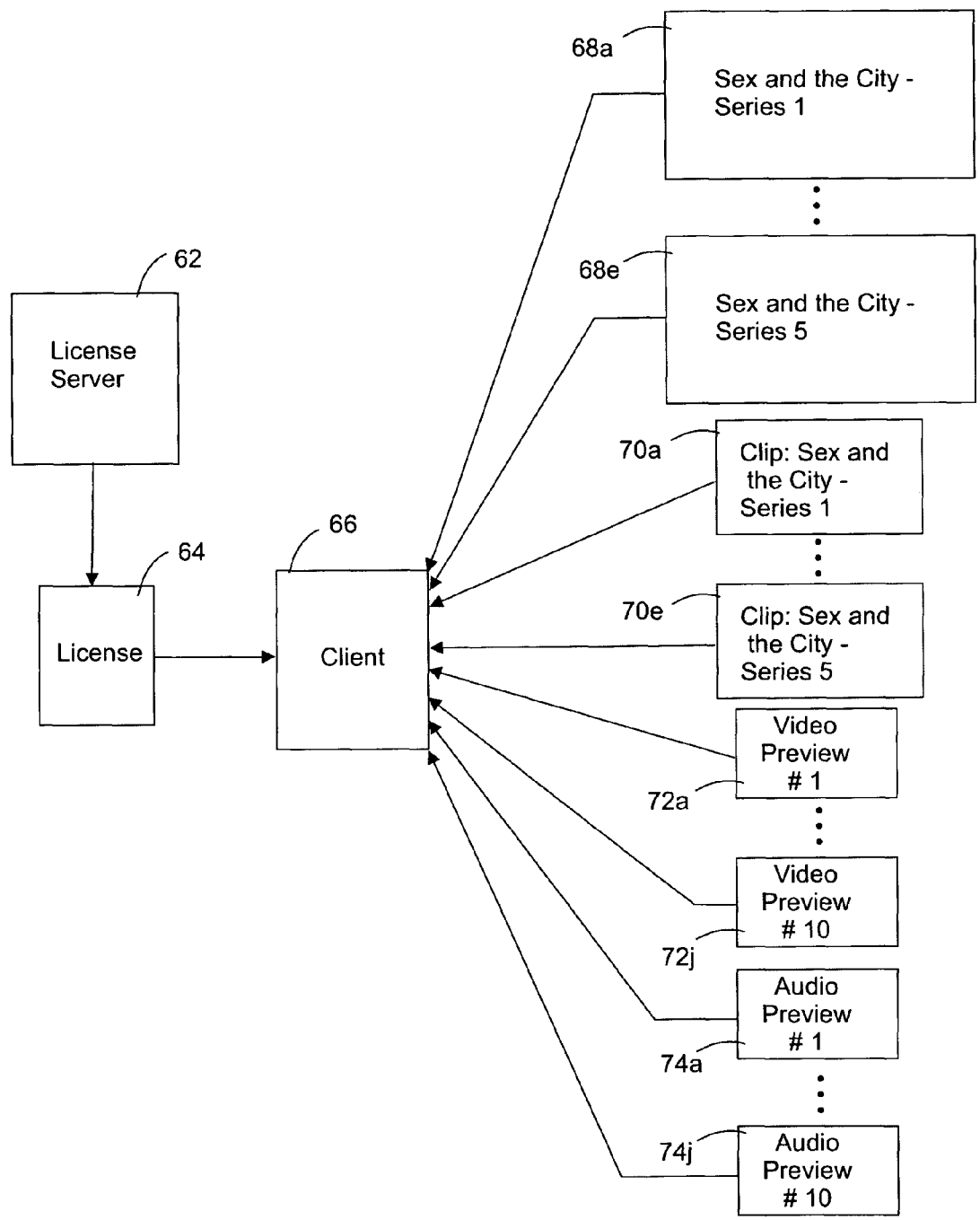
FIG. 3 is a simplified block diagram of a portion of a content providing system according to some embodiments for use in distributing content.

FIG. 3 illustrates a mechanism for granting rights to content and for the usage of the content in accordance with an embodiment of the invention.

Referring to FIG. 3, there is shown a license server 62, a license 64, a client 66, and a plurality of items of content. The license server 62 is owned or controlled by a trusted issuer and issues the license 64 to the client 66 belonging to a user. Available for being downloaded or otherwise received by the client 66 are a plurality of items of content, including in this example:

(i) five items of principal content 68a-68e comprising five series of television shows, entitled "Sex and the City—Series 1," "Sex and the City—Series 2," "Sex and the City—Series 3," "Sex and the City—Series 4," and "Sex and the City—Series 5;"

(ii) five items of clip content comprising five clips or bonus tracks 70a-70f entitled "Clip: Sex and the City—Series 1," "Clip: Sex and the City—Series 2," "Clip: Sex and the City—Series 3," "Clip: Sex and the City—Series 4," and "Clip: Sex and the City—Series 5," each of which is associated with the item of principal content 68a-68f bearing a similar title;

(iii) ten items of video preview content 72a-72j, entitled "video preview #1," "video preview #2," etc., through "video preview #10," comprising previews of ten movies, other television shows (which can be other "Sex and the City" shows or different television programs), or other types of video content; and (iv) ten items of audio preview content 74a-74j, entitled "audio preview #1," "audio preview #2," etc., through "audio preview #10," comprising previews of ten musical works, such as for example, songs or instrumentals, or of other types of audio content.

Depending upon the conditions and rights granted by the license 64, one or more of these items of content may be used by the client 66. However if the license 64 does not grant rights to one or more of these items of content, they cannot be used, although they could be received by and stored on the client 66 in unusable form.

Figure 4:
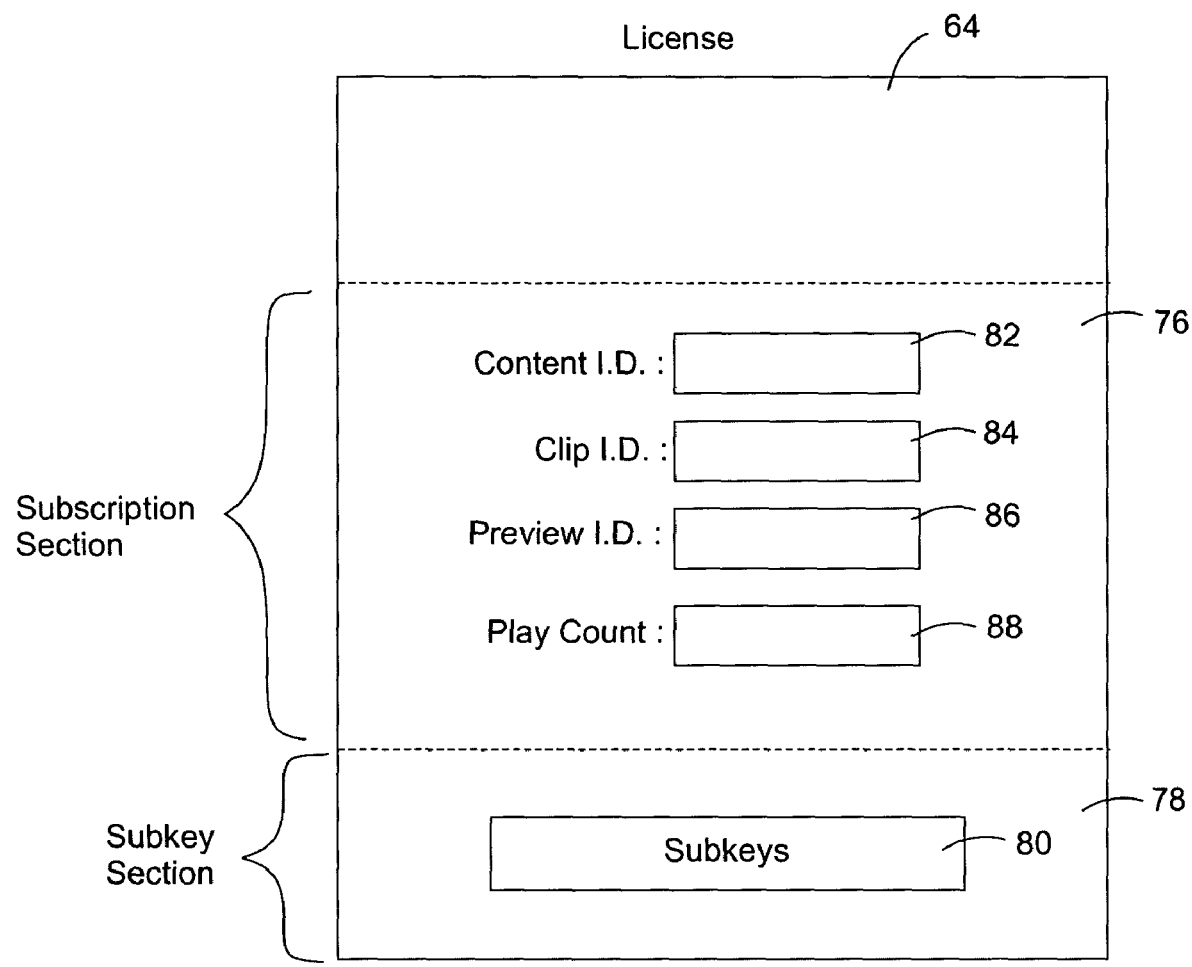
FIG. 4 is a simplified diagram of a digital license according to some embodiments of the invention.

FIG. 4 is a simplified representation of the license 64 and certain data or information contained within the license 64 according to one embodiment of the invention. Referring to FIG. 4, the license 64 has a subscription section 76 and a subkey section 78. The subkey section 78 contains one or more subkeys 80, which as explained further below, can be used in the generation of one or more decryption keys. The subscription section 76 contains a principal content identification field 82, a preview identification field 86, a clip identification field 84, and a play count field 88. As explained further below, value or attribute data can be inserted in these fields for controlling access or use by the client 66 of certain items of content.

Figure 5:
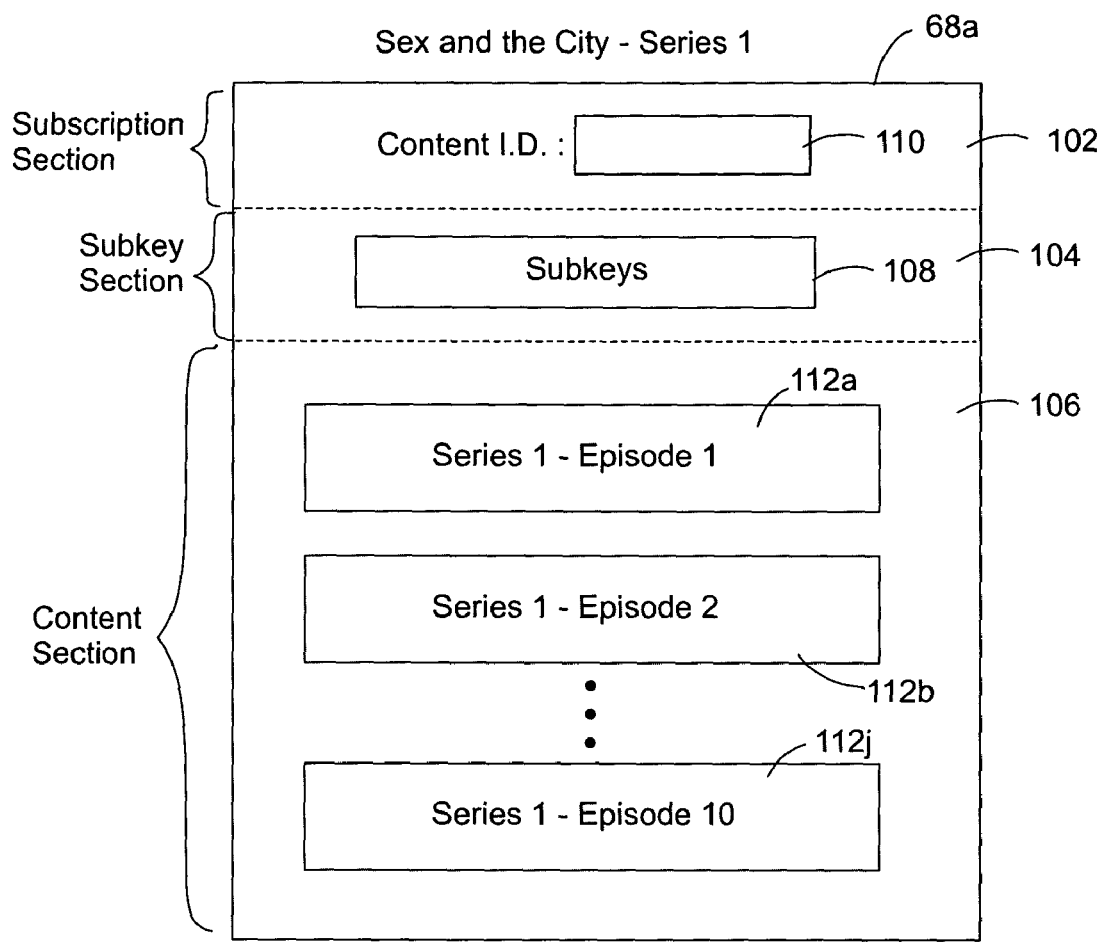
FIG. 5 is a simplified diagram of one item of digital content according to some embodiments of the invention.

FIG. 5 is a simplified representation of the item of principal content entitled, "Sex and the City—Series 1." 68a Referring to FIG. 5, the item of content 68a has a subscription section 102, a subkey section 104, and a content section 106. The subkey section 104 contains one or more subkeys 108 that can be combined by the client 66 with the one or more associated subkey(s) 80 contained in the license 64 (FIG. 4) whereby algorithms are used to derive one or more decryption keys (not shown) for the content. Thus in order to enhance DRM security, the client 66 must have both the license 64 and the item of content 68a in order to extract subkeys from each of the license 64 and the item of content 68a, which in turn are used to derive the one or more decryption keys.

The subscription section 102 contains a principal content identification field 110 into which can be placed value or attribute data corresponding to the identity of this item of principal content, "Sex and the City—Series 1." 68a The content section 106 contains ten discretely-usable items of subcontent, which in this example are ten episodes or shows 112a-112j which make up the principal content of the series, "Sex and the City—Series 1." 68a In this example, the episodes 112a-112j are entitled "Series 1—Episode 1", "Series 1—Episode 2", through "Series 1—Episode 10." While FIG. 5 illustrates the item of content, "Sex and the City—Series 1" 68a, it will be appreciated that the remaining four items of principal content 68b-68e (FIG. 3) have a similar content structure.

Also, it will be appreciated that alternative embodiments include items of principal content that are not only television series, but also sets of television shows that may be related to one another (as in a television series) or may be unrelated to one another. Items of principal content may also include movies, documentaries, theatrical productions, lectures, music videos, musical works and other audio, visual, or audio/visual content. These items of principal content may or may not include discretely-usable items of subcontent.

FIG. 6 is a simplified representation of the item of bonus track or clip content entitled, "Clip: Sex and the City—Series 1." 70a Referring to FIG. 6, the clip content 70a has a subscription section 114, a subkey section 116, and a clip content section 118. The subkey section 116 contains a subkey 120 which can be combined by the client 66 with an associated subkey 80 contained in the license 64 (FIG. 4) whereby algorithms are used to derive a decryption key for this item of clip content 70a.

The subscription section 114 contains a clip identification field 122 into which can be placed value or attribute data corresponding to the identity of this item of clip content, "Clip: Sex and the City—Series 1." 70a The content section 118 contains the bonus track or clip content 124 associated with the item of principal content of the series, "Sex and the City—Series 1." 68a While FIG. 6 illustrates the item of clip content, "Clip: Sex and the City—Series 1" 70a, it will be appreciated that the remaining four items of clip content 70b-70e (FIG. 3) have a similar content structure.

FIG. 7 is a simplified representation of the item of audio preview content entitled, "Audio Preview #1." 74a Referring to FIG. 7, the content 74a has a subscription section 126, a subkey section 128, and a preview content section 130. The subkey section 128 contains a subkey 132 which can be combined by the client 66 with an associated subkey 80 contained in the license 64 (FIG. 4) whereby algorithms are used to derive a decryption key (not shown) for this audio preview content 74a.

The subscription section 126 contains a preview identification field 134 into which can be placed value or attribute data corresponding to the identity of this item of audio preview content, "Audio Preview #1." 74*a* The content section 130 contains the audio preview content 136 itself that corresponds to a full version of the audio content (not shown) that is being previewed. While FIG. 7 illustrates the item of audio preview content, "Audio Preview #1" 74*a*, it will be appreciated that the remaining nine items of audio preview content 74*b*-74*j* (FIG. 3) have a similar content structure.

FIG. 8 is a simplified representation of the item of the video preview content entitled "Video Preview #1." 72*a* Referring to FIG. 8, the item of content 72*a* has a subscription section 138, a subkey section 140, and a preview content section 142. The subkey section 140 contains a subkey 144 which can be combined by the client 66 with an associated subkey 80 contained in the license 64 (FIG. 4) whereby algorithms are used to derive a decryption key (not shown) for this video preview content 72*a*.

The subscription section 138 contains a preview identification field 146 into which can be placed value or attribute data corresponding to the identity of this item of video preview content, "Video Preview #1." 72*a* The content section 142 contains the video preview content 148 itself that corresponds to a full version of the video content (not shown) that is being previewed, which could be a movie, a television series or episode, a music video, or other video content. While FIG. 8 illustrates the item of video preview content, "Video Preview #1" 72*a*, it will be appreciated that the remaining nine items of video preview content 72*b*-72*j* (FIG. 3) have a similar content structure.

The following is a description of the operation of one embodiment of the inventions. FIG. 9 is a chart showing an assignment of attribute or value data that are placed in the identification fields of the items of principal content 68*a*-68*e*, clip content 70*a*-70*e*, audio preview content 74*a*-74*j*, and video preview content 72*a*-72*j* (FIG. 3), according to this example. In other words, in this example, the content identification field 110 (FIG. 5) for the item of principal content entitled "Sex and the City—Series 1" 68*a* contains the value or attribute "1". Similarly, the content identification field 110 for the item of principal content entitled "Sex and the City—Series 2" 68*b* contains the value or attribute "2", etc. A similar pattern of value assignments is established for the clip content 70*a*-70*e*. (FIG. 3) However, the items of video and audio preview content employ a different identification system. All items of video preview content fields 146 (FIG. 8) contain the same value, which in this example is the value "2." Similarly, all items of audio preview content fields 134 (FIG. 7) contain the value "1."

It will be appreciated, however, that other embodiments of the invention may use a different system of identification field values or attributes, including another numbering system or alphanumeric designations or variables, etc.

With the identification fields of the various items of content so populated, the issuance of licenses and content to users is facilitated so that one license can govern usage rights to a plurality of items of content that are received by the client 66 after the license 64 has been received. Moreover, the data in the identification fields 82, 84, 86, 88 of the license 64 remains unchanged after the license 64 has been received. Thus certain embodiments of the invention can be used as part of a subscription business model whereby one license is issued to a client, and thereafter a plurality of items of content can be transmitted to and used by the client under the control of this one license. The items of content can be transmitted to the client at later points in time, being spaced apart by about an hour, a day, a week or other time intervals as desired by the user and permitted by the content provider.

For example, if a user pays for and receives the license 64 with a principal content identification field 82 having a value "1," then the client 66 will only be able to use the item of content entitled "Sex and the City—Series 1." 68*a* However, all ten episodes 112*a*-112*j* in Series 1 would be usable. In other words, the client 66 reads the principal content identification field data found in the license 64 and compares this data with the content identification field data found in the item of principal content 68*a* itself. If the data correspond with one another (e.g., they match or fall within a range of values, etc.), then the client 66 can use the content by using one or more decryption keys that were generated with the subkeys as previously described. The other items of content, such as "Sex and the City—Series 2", etc., while potentially able to be downloaded to or received by the client 66, will nevertheless not be able to be used under this license 64 in this example.

The play count field 88 (FIG. 4) in the license 64 designates how many episodes within any given item of principal content series may be used. If the play count field is empty, then all episodes may be used, assuming the content identification field 82 of the license 64 has appropriate value data in it. On the other hand, for example, if the license 64 has a content identification field value of "3," and a play count field value of "5," then the client 66 may only use any 5 episodes of the content entitled "Sex and the City—Series 3." 68*c* No more than 5 different episodes may be used, however, under this license 64 in this example.

As another example, if the license 64 has a principal content identification field 82 containing the expression: "1≦ [content i.d.]≦5," and the play count field 88 is empty, then the client 66 will be able to use all ten episodes in each of all five "Sex and the City" series. 68*a*-68*e* As yet another example, if the license's principal content identification field 82 contains the expression: "1∥4," and the play count field is empty, then the client 66 will be able to use all ten episodes each of only the two specific items of principal content: "Sex and the City—Series 1" 68*a* and "Sex and the City—Series 4." 68*d*

The contents of the clip content identification field 84 in the subscription section 76 of the license 64 (FIG. 4) is used in a similar manner by the client 66. The data in the clip content field 84 designates which clip or bonus track items of content are licensed for use by the client 66. Thus for example, if the license 64 has a principal content identification field 82 containing the value "2" and the clip content identification field 84 containing a value "2", then the client 66 would not only be able to use the principal content entitled "Sex and the City—Series 2" 68*b*, but also use the clip content "Clip: Sex and the City—Series 2." 70*b* According to some business models, such a license 64 would cost more money than a license having no value in the clip identification field, since the user would be able to view the clip or bonus track associated with the principal content as well as view the principal content itself.

The music and video preview identification fields 134, 146 (FIGS. 7 & 8) operate in a different manner. The license preview identification field 86 (FIG. 4) permits the use of all of one kind of preview (e.g., video or audio) or the other or both. Thus for example, if the preview identification field 86 in the license 64 contained the value "1," then the client 66 could use all ten items of audio preview content, entitled "Audio Preview #1", "Audio Preview #2", . . . "Audio Preview #10," but the client 66 could not use any items of video preview content. (FIG. 9) On the other hand, if the preview identification field 86 in the license 64 contained the value "2," then the client 66 could use all ten items of video preview content, entitled "Video Preview #1", "Video Preview #2", . . . "Video Preview #10," but could not use any audio preview items of content. In alternative embodiments, however, the audio and video preview contents could be grouped in other arrangements, or could be individually identified with unique values in each of their respective identification fields. In this event, access to preview contents could be controlled in a manner similar to the items of principal content previously described.

Figure 10:
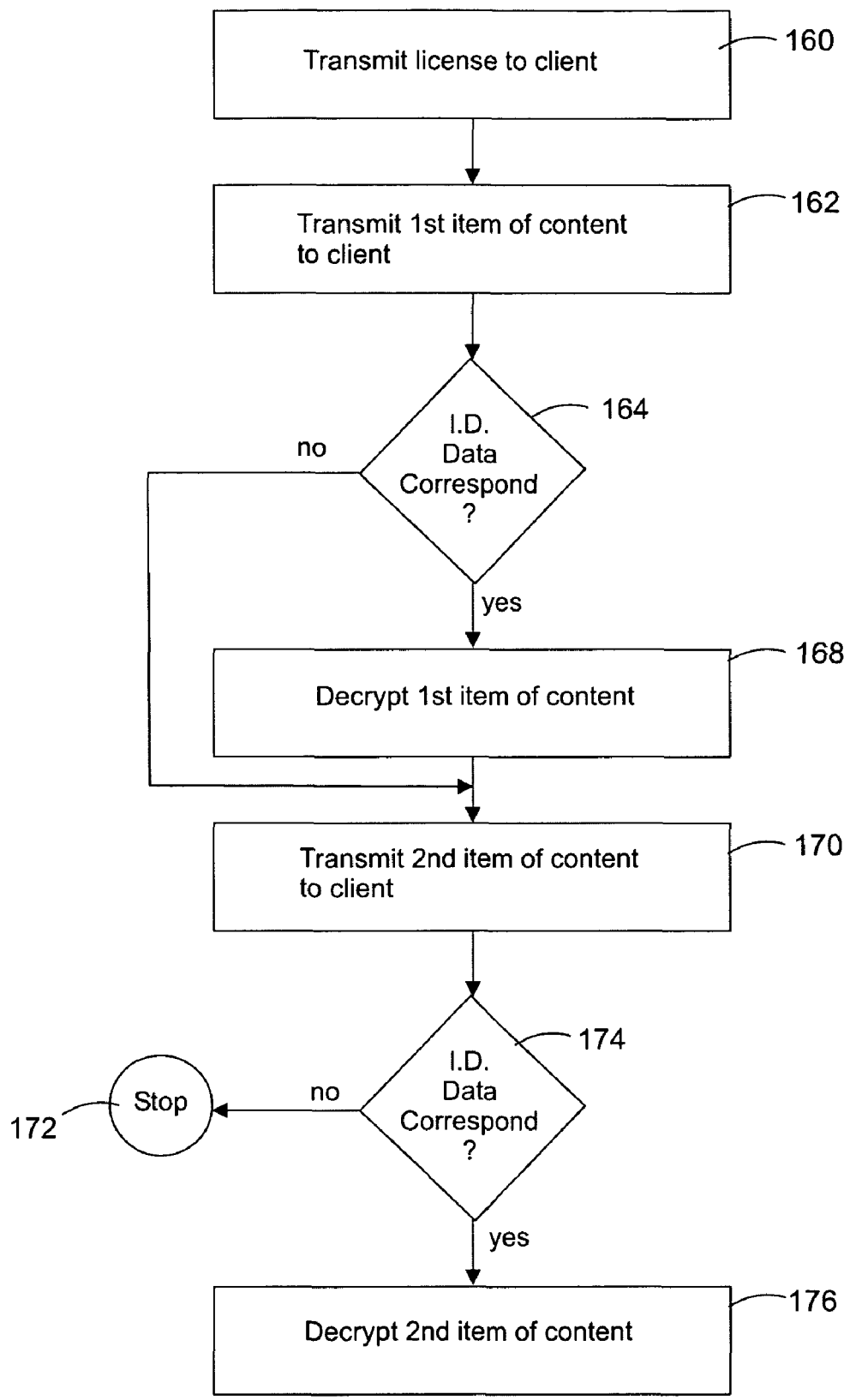
FIG. 10 is a simplified flow diagram of a method of distributing content according to some embodiments of the invention.

FIG. 10 is a simplified flow diagram of a method of distributing content according to some embodiments of the invention. A license having identification data for licensed content is transmitted to a client. 160 Later, a first item of content is transmitted to the client after receipt by the client of the license. 162 The first item of content has first content identification data, and at least a portion of the first item of content is in encrypted form. Then a determination is made whether the first content identification data corresponds to the identification data for licensed content. 164 If the data corresponds, then the encrypted portion of the first item of content in decrypted. 168

Next, a second item of content is transmitted to the client. 170 The second item of content has second content identification data that is different from the first content identification data, and at least a portion of the second item of content is in encrypted form. However, if the determination represented by block 164 shows that the data does not correspond, then the first item of content cannot be decrypted, and instead, the process goes to block 170 where the second item of content is transmitted to the client. A determination is made whether the second content identification data corresponds to the identification data for licensed content. 174 If the data does not correspond, then the process stops. 172 On the other hand, if the data does correspond, then the encrypted portion of the second item of content is decrypted. 176 Throughout the above-described process, the identification data for licensed content remains unchanged after the license has been transmitted to the client.

Thus there are provided methods and systems of distributing digital content governed by a digital license. According to some embodiments, the issuance of licenses and content to users is facilitated so that one license can govern usage rights to a plurality of items of content that are received by a client device after the license has been received. Moreover, the licenses have data in licensed content identification fields that remain unchanged after the license has been received by the user. Thus embodiments of the invention can be used as part of a subscription business model whereby one license is issued to a client, and thereafter a plurality of items of content can be transmitted to and used by the client under the control of this one license.

While the description above refers to particular embodiments of the present invention, it will be understood that many modifications may be made without departing from the spirit thereof. The claims are intended to cover such modifications as would fall within the true scope and spirit of the present invention. The presently disclosed embodiments are therefore to be considered in all respects as illustrative and not restrictive, the scope of the invention being indicated by the claims rather than the foregoing description, and all changes which come within the meaning and range of equivalency of the claims are therefore intended to be embraced therein.

What is claimed is:

1. A method of distributing content for use by a client, the method comprising:

transmitting, using a central processing unit (CPU), identification data for licensed content to the client by sending to the client a license having the identification data for the licensed content;

transmitting a first item of content to the client after receipt by the client of the license, wherein at least a portion of the first item of content is in encrypted form, and wherein the first item of content has first content identification data;

transmitting a second item of content to the client after receipt by the client of the license, wherein at least a portion of the second item of content is in encrypted form, and wherein the second item of content has second content identification data that is different from the first content identification data;

wherein at least a portion of the identification data for licensed content in the license corresponds to the first content identification data and the second content identification data;

comparing by the client of the first content identification data with the identification data for licensed content as taken from the license;

decrypting by the client of the encrypted portion of the first item of content after the comparing by the client of the first content identification data with the identification data for licensed content;

comparing by the client of the second content identification data with the identification data for licensed content as taken from the license; and decrypting by the client of the encrypted portion of the second item of content after the comparing by the client of the second content identification data with the identification data for licensed content, wherein the identification data for licensed content that is located at the client is adapted to remain unchanged after the license is sent to the client.

2. The method of claim 1 wherein the first and second items of content are transmitted to the client at different points in time, wherein the points in time are spaced apart from each other by a time interval of at least one hour.

3. The method of claim 1 wherein the first and second items of content are transmitted to the client at different points in time, wherein the points in time are spaced apart from each other by a time interval of at least one day.

4. The method of claim 1 wherein the first item of content comprises one of a first movie and at least a portion of a first television series, and wherein the second item of content comprises a clip of one of a second movie and at least a portion of a second television series.

5. The method of claim 1 wherein the first item of content comprises one of a movie and at least a portion of a television series, and wherein the second item of content comprises a clip of the one of the movie and the at least a portion of the television series.

6. The method of claim 1 wherein the license has a first subkey, wherein the first item of content has a second subkey, and wherein the second item of content has a third subkey, the method further comprising:

combining the first and second subkeys at the client thereby creating a first decryption key; and combining the first and third subkeys at the client thereby creating a second decryption key;

wherein decrypting the encrypted portion of the first item of content includes decrypting the first item of content using the first decryption key; and wherein decrypting the encrypted portion of the second item of content includes decrypting the second item of content using the second decryption key.

7. A method of distributing content for use by a client, the method comprising:

transmitting, using a central processing unit (CPU), identification data for the licensed content to the client by sending to the client a license having the identification data for licensed content;

transmitting at least five items of content to the client after receipt by the client of the license, wherein at least a portion of each of the at least five items of content are in encrypted form, wherein each of the at least five items of content has first content identification data, and wherein no two of the at least five items of content have first content identification data that are equal, wherein at least a portion of the identification data for licensed content in the license corresponds to the first content identification data for all of the five items of content;

comparing by the client of the first content identification data for each of the at least five items of content with the identification data for licensed content; and decrypting by the client of the encrypted portion of each of the at least five items of content after the comparing by the client of the first content identification data for each of the at least five items of content with the identification data for licensed content;

wherein the identification data for licensed content that is located at the client is adapted to remain unchanged after the license is sent to the client.

8. The method of claim 7 wherein each of the at least five items of content are transmitted to the client at different points in time, wherein each of the points in time are spaced apart from each other by a time interval of at least one hour.

9. The method of claim 7 wherein each of the at least five items of content are transmitted to the client at different points in time, wherein each of the points in time are spaced apart from each other by a time interval of at least one day.

10. The method of claim 7 wherein the at least five items of content are comprised of at least five movies.

11. The method of claim 7 wherein the at least five items of content are comprised of at least five sets of television shows.

12. The method of claim 7 wherein the at least five items of content are comprised of at least five musical works.

13. A method of distributing content for use by a client, the method comprising:

transmitting, using a central processing unit (CPU), identification data for licensed content to the client by sending the client a license having the identification data for licensed content;

transmitting at least five items of content to the client after receipt by the client of the license, wherein at least a portion of each of the at least five items of content is in encrypted form, wherein each of the at least five items of content has first content identification data, and wherein the first content identification data for each of the at least five items of content are equal to one another, wherein at least a portion of the identification data for licensed content in the license corresponds to the first content identification data for all of the at least five items of content;

comparing by the client of the first content identification data for each of the at least five items of content with the identification data for licensed content; and decrypting by the client of the encrypted portion of each of the at least five items of content after the comparing by the client of the first content identification data for each of the at least five items of content with the identification data for licensed content;

wherein the identification data for licensed content that is located at the client is adapted to remain unchanged after the license is sent to the client.

14. The method of claim 13 wherein each of the at least five items of content are transmitted to the client at different points in time, wherein each of the points in time are spaced apart from each other by a time interval of at least one day.

15. The method of claim 13 wherein each of the at least five items of content is comprised of a video preview.

16. The method of claim 13 wherein each of the at least five of items of content is comprised of an audio preview.

17. The method of claim 13 wherein the license further has a license subkey, and wherein each of the at least five items of content has a content subkey, the method further comprising:

combining the license subkey and the content subkey at the client thereby creating a decryption key;

wherein decrypting the encrypted portion of each of the at least five items of content includes decrypting the encrypted portion of each of the at least five items of content using the decryption key.

18. A method of distributing content for use by a client, the method comprising:

transmitting, using a central processing unit (CPU), a license to the client, the license having identification data for licensed content and having play count data;

transmitting a first item of content to the client after receipt by the client of the license, wherein the first item of content is comprised of N discretely-usable items of subcontent, where N is an integer greater than 2, wherein each of the N discretely-usable items of subcontent has first content identification data, and wherein at least a portion of each of the N discretely-usable items of subcontent is in encrypted form, wherein at least a portion of the identification data for licensed content in the license corresponds to the first content identification data of all of the N discretely-usable items of subcontent;

comparing by the client of the first content identification data for each of P of the N discretely-usable items of content with the identification data for licensed content; and decrypting by the client of at least a portion of each of no more than P of the N discretely-usable items of subcontent after the comparing by the client of the first content identification data with the identification data for licensed content, where P corresponds to the play count data, and where P is an integer less than N, wherein the identification data for licensed content and the play count data that is located at the client are adapted to remain unchanged after the license is transmitted to the client.

19. The method of claim 18 wherein the N discretely-usable items of subcontent are comprised of N television shows.

20. The method of claim 18 wherein the N discretely-usable items of subcontent are comprised of N musical works.

21. A system for controlling the use by a client of a first item of content and a second item of content, the system comprising:

a device having a processing unit capable of executing software routines, wherein the processing unit is programmed to control the use of the first and second items of content by:

processing a license having identification data for licensed content; and transmitting the license to the client prior to receipt by the client of the first and second items of content;

wherein the first item of content has first content identification data that is adapted to be compared by the client with the identification data for licensed content as taken from the license, wherein at least a portion of the first item of content is in encrypted form and is adapted to be decrypted by the client after the comparing by the client of the first content identification data with the identification data for licensed content;

wherein the second item of content has second content identification data that is different from the first content identification data and that is adapted to be compared by the client with the identification data for licensed content as taken from the license, wherein at least a portion of the second item of content is in encrypted form and is adapted to be decrypted by the client after the comparing by the client of the second content identification data with the identification data for licensed content;

wherein at least a portion of the identification data for licensed content in the license corresponds to the first content identification data and the second content identification data;

wherein the identification data for licensed content is adapted to remain unchanged at the client.

22. The system of claim 21 wherein the first item of content comprises one of a first movie and a first set of television shows, and wherein the second item of content comprises a clip of one of a second movie and a second set of television shows.

23. The system of claim 21 wherein the first item of content comprises one of a movie and a set of television shows, and wherein the second item of content comprises a clip of the one of the movie and the set of television shows.

24. The system of claim 21 wherein the license further has a first subkey, the first item of content further has a second subkey, and the second item of content further has a third subkey, wherein the client is adapted to combine the first and second subkeys thereby creating a first decryption key and to combine the first and third subkeys thereby creating a second decryption key, and wherein the first decryption key is for use in decrypting the encrypted portion of the first item of content, and the second decryption key is for use in decrypting the encrypted portion of the second item of content.

25. A system for controlling the use by a client of a first item of content, the system comprising:

a device having a processing unit capable of executing software routines, wherein the processing unit is programmed to control the use of the first item of content by:

processing a license having identification data for licensed content and having play count data; and transmitting the license to the client prior to the receipt by the client of the first item of content;

wherein the first item of content has first content identification data and is comprised of N discretely-usable items of subcontent where N is an integer greater than 2, wherein each of the N discretely-usable items of subcontent has first content identification data, and wherein at least a portion of each of the N discretely-usable items of subcontent is in encrypted form;

wherein at least a portion of the identification data for licensed content in the license corresponds to the first content identification data of all of the N discretely-usable items of subcontent;

wherein the at least a portion of each of no more than P of the N discretely-usable items of subcontent is adapted to be decrypted by the client after a comparison by the client of the first content identification data with the identification data for licensed content, where P corresponds to the play count data, and where P is an integer less than N, and wherein the identification data for licensed content and the play count data that is located at the client are adapted to remain unchanged after the license is transmitted to the client.

26. The system of claim 25 wherein the N discretely-usable items of subcontent are comprised of N television shows.

27. The system of claim 25 wherein the N discretely-usable items of subcontent are comprised of N musical works.

* * * * *

UNITED STATES PATENT AND TRADEMARK OFFICE
CERTIFICATE OF CORRECTION

PATENT NO. : 7,827,113 B2  
APPLICATION NO. : 11/095051  
DATED : November 2, 2010  
INVENTOR(S) : Saeki et al.

Page 1 of 1

It is certified that error appears in the above-identified patent and that said Letters Patent is hereby corrected as shown below:

In the CLAIMS:  
Claim 16, column 12, line 19, after "five" delete "of".  
Claim 25, column 14, lines 19-20, after "content" delete "has first content identification data and".

Signed and Sealed this  
Twenty-ninth Day of March, 2011

David J. Kappos  
*Director of the United States Patent and Trademark Office*